United States Patent
Ilyas et al.

(10) Patent No.: US 11,863,505 B1
(45) Date of Patent: Jan. 2, 2024

(54) ENHANCED INSTANT MESSAGING BY ENABLING COLLECTIVE COMMENTS ON MULTIPLE ITEMS IN A COMMUNICATION THREAD

(71) Applicant: King Faisal University, Al-Ahsa (SA)

(72) Inventors: Qazi Mudassar Ilyas, Al-Ahsa (SA); Abid Mehmood, Al-Ahsa (SA); Matasem Saleh, Al-Ahsa (SA); Raazia Saher, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/224,740

(22) Filed: Jul. 21, 2023

(51) Int. Cl.
*G06F 15/16* (2006.01)
*H04L 51/04* (2022.01)
*H04L 51/216* (2022.01)

(52) U.S. Cl.
CPC ............ *H04L 51/04* (2013.01); *H04L 51/216* (2022.05)

(58) Field of Classification Search
CPC .............................. H04L 51/04; H04L 51/216
USPC .......................................................... 709/206
See application file for complete search history.

(56) References Cited

U.S. PATENT DOCUMENTS

| | | | |
|---|---|---|---|
| 7,062,536 B2 | 4/2006 | Fellenstein | |
| 7,596,603 B2 | 9/2009 | Chen | |
| 7,769,144 B2 | 8/2010 | Yao | |
| 8,140,636 B2 | 3/2012 | Jones | |
| 10,063,509 B2 | 8/2018 | Bastide | |
| 11,558,333 B1 | 1/2023 | Cvet | |
| 2006/0059235 A1 | 3/2006 | Peterson | |
| 2009/0172104 A1* | 7/2009 | Jones | H04L 51/04 709/206 |
| 2015/0033149 A1* | 1/2015 | Kuchoor | H04N 21/4782 715/753 |
| 2017/0351650 A1* | 12/2017 | Yang | H04L 51/216 |
| 2018/0034879 A1* | 2/2018 | Chegini | G11B 27/102 |
| 2018/0367483 A1* | 12/2018 | Rodriguez | H04L 51/046 |
| 2022/0215431 A1* | 7/2022 | El Ghazzal | G06Q 30/0208 |

OTHER PUBLICATIONS

Zhang, Amy et al. "Making Sense of Group Chat through Collaborative Tagging and Summarization". Nov. 2018. pp. 1-27. (Year: 2018).*

* cited by examiner

*Primary Examiner* — Imad Hussain
(74) *Attorney, Agent, or Firm* — Nath, Goldberg & Meyer; Richard C. Litman

(57) ABSTRACT

A message communication system provides shared communication with plural users in an Instant Messaging (IM) protocol by enabling collective comments on multiple items in a communication thread. A host IM application provides a routine to allow group chat, with individual communication threads categorized by indicia. Each user is able to select, group, annotate and comment on multiple items as a selected set. The system allows the user to expand the plurality of users in a conversation thread so as to include more than two users.

4 Claims, 12 Drawing Sheets

ENHANCED INSTANT MESSAGING BY ENABLING COLLECTIVE COMMENTS ON MULTIPLE ITEMS IN A COMMUNICATION THREAD

BACKGROUND

Technical Field

The present disclosure generally relates to instant messaging, and more particularly to categorizing multiple items in a chat session and commenting on the multiple items jointly.

Background Art

The term "instant messaging" (IM) refers to near-real-time communication between two or more individuals. IM may include exchanging text, audio, video, or computer files of any type. The term "IM platform" or "IM application" refers to any stand-alone, embedded, or web-based application running on personal computing devices like laptop or desktop computers, cell phones, tablets, or hybrid devices, such as phablets. Examples of popular IM applications include WhatsApp, Telegram, Facebook Messenger, WeChat, and Discord. IM applications generally provide a user-friendly interface for instant communication. While replying to a particular message, the users are usually allowed to select that message before replying to it. This creates a reference between the message and the user's response to it to facilitate tracking in a conversation. The existing IM applications permit this ability in one-to-one form only, i.e., a user can select and reply to only one message at a time. There is no mechanism to select multiple messages and give a joint response to the multiple items. Moreover, sometimes a user wants to group and organize multiple messages in the form of unnamed or named categories and comment on these categories simultaneously. This ability can significantly enhance the user experience and productivity, especially when the communication involves many items or files.

SUMMARY

A message communication system provides shared communication with a plurality of users and enhances instant messaging experience by enabling collective comments on multiple items in a communication thread. A host Instant Messaging (IM) application implements a routine to allow the users to group chat or items in individual communication threads and categorize the individual communication threads into categories by using indicia, such as, by way of non-limiting example, text labels or colors. This allows each user to select multiple items, order the multiple items, group the multiple items, annotate the multiple items and comment on the multiple items together so as to be integrated with the host IM application and enable the implementation of related controls in the host IM application. A grouping routine allows each user to select multiple items as a selected set, order the multiple items, group the multiple items, annotate the multiple items and comment on the multiple items together. The grouping routine includes a selection of a set of names for different open chat sessions of an instant messenger and providing a single responsive posting to the selected set. The system is configured to allow each user to annotate the single responsive posting in a chat log to indicate the names in the selected set having received the single responsive posting, and allows the user to select multiple items, order the multiple items, group the multiple items, annotate the multiple items and comment on the multiple items together in the selected set. The system includes a routine to permit the user to further comment on the categories. This provides message views as communication threads along with the user's labels and comments as a unit of communication threads as a chat item, thereby permitting commenting on the communication thread as at least part of the selected set. A routine allows each user to store the communication threads in groups with labels, and comments in the form of annotation for the user's future reference without requiring sending the communication threads with the annotation to other users. A further routine provides a capability of expanding the plurality of users in a conversation thread so as to include more than two users.

DETAILED DESCRIPTION

Figure 1:
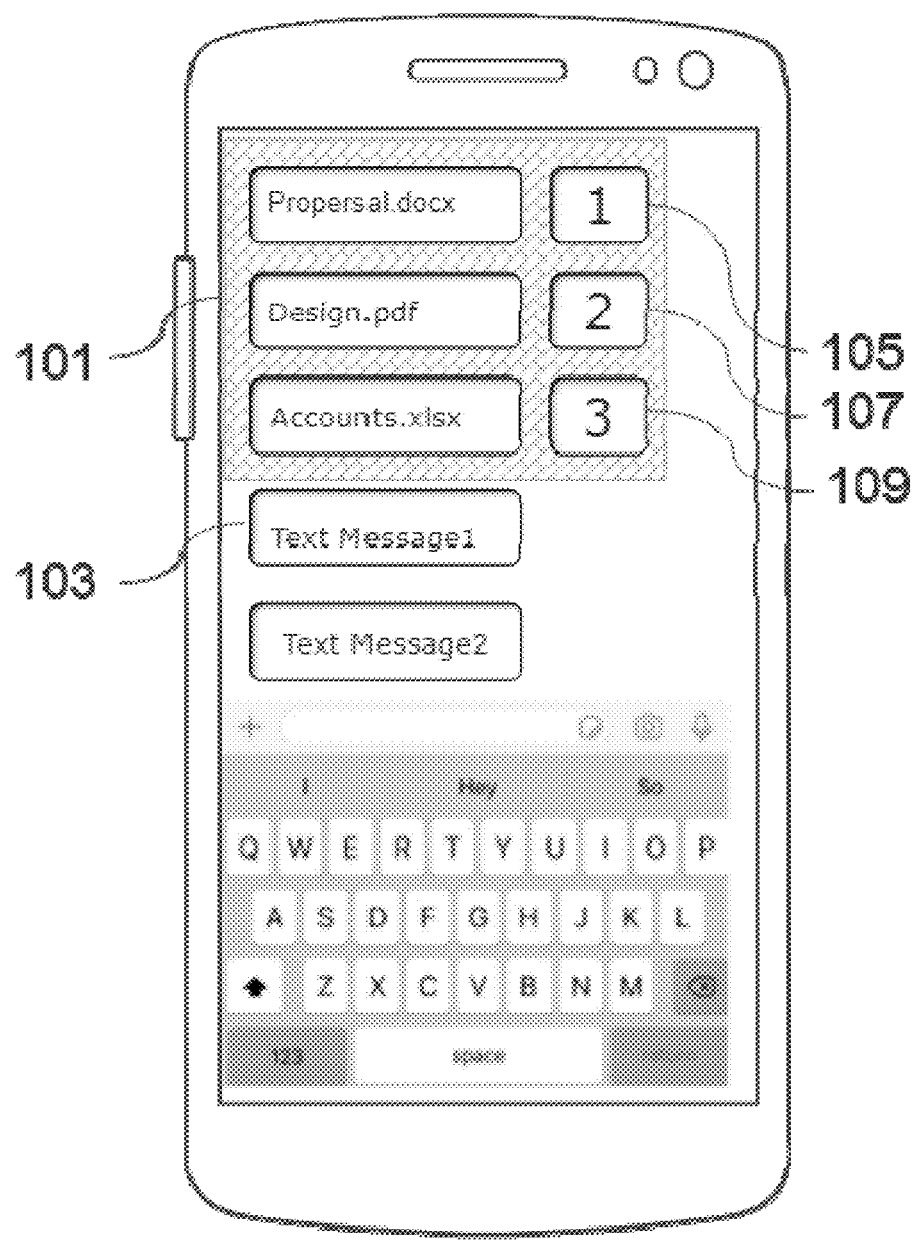
FIG. 1 is a schematic diagram showing a configuration in which a user can select multiple chat items in a conversation and number the multiple chat items sequentially.

The disclosed technology is configured to allow Instant Messaging (IM) users to select multiple items in a chat thread, group, label, annotate, comment, and reply to these comments or other postings together in an arrangement in which IM messages are easily grouped by topic and by a plurality of users. The technology permits expanding the plurality of users in a conversation thread so as to include more than two users. The chat items can be categorized and grouped using indicia, such as, by way of non-limiting example, text labels or colors. The disclosed technology treats chat items, user-assigned labels or colors, and associated comments as a chat unit to which a receiver can also reply. In one configuration, a user can generate such groupings of chat items and comments as annotations and save them for the user's own future reference instead of sending them to other individuals. The disclosed technology provides a software component to be integrated with the host IM application and enables the implementation of related functions in the host application. The described approach is configured to enhance the IM user experience and leads to improved productivity.

The disclosed technology discloses a method to allow users to group various chat items in a communication thread and categorize the chat items using indicia, such as, by way of non-limiting example, text labels or colors. The user can further comment on these categories. As the receiver of such a message views the groups of chat items along with their labels and comments as a unit of chat item, the receiver of the message can comment on this entire unit. Another configuration of the disclosed technology allows a user to store these groups of chat items, labels, and comments in the form of annotation for the user's own future reference instead of sending them to other users.

The disclosed technology provides a method, system, and software component to be integrated with a host IM application and is configured to enable the implementation of related functions in the host application. Different configurations of the disclosed technology are configured to allow the user to select multiple items within a conversation thread, order, group, annotate, comment, and respond to these comments as part of a joint on-line chat.

The present disclosure is directed to a message communication system which provides shared communication with a plurality of users to enhance an instant messaging experience by enabling collective comments on multiple items in a communication thread. The communication system includes a host IM application with a routine configured to allow the users to group chat or items in individual communication threads and categorize the individual communication threads into categories by using indicia, thereby allowing each user to select multiple items, order the multiple items, group the multiple items, annotate the multiple items and comment on the multiple items together so as to integrate with the host IM application and enable the implementation of related controls in the host IM application. The communication system also includes a grouping routine configured to allow each user to select multiple items as a selected set, order the multiple items, group the multiple items, annotate the multiple items and comment on the multiple items together, wherein the grouping routine includes selection of a set of names for different open chat sessions of an instant messenger and providing a single responsive posting to the selected set.

A particular embodiment of the communication system includes a routine configured to allow each user to annotate the single responsive posting in a chat log to indicate the names in the selected set having received the single responsive posting, and allows the user to select multiple items, order the multiple items, group the multiple items, annotate the multiple items and comment on the multiple items together in the selected set. A routine is configured to permit the user to further comment on the categories, such a message views the communication threads along with their labels and comments as a unit of communication threads as a chat item, thereby permitting commenting on the communication thread as at least part of the selected set. A routine is configured to allow each user to store the communication threads in groups with labels, and comments in the form of annotation for the user's future reference without requiring sending the communication threads with the annotation to other users. And, a routine is configured to provide a capability of expanding the plurality of users in a conversation thread so as to include more than two users.

In a particular embodiment, a routine is configured to refer to the conversation items and comment on the multiple items, using assigned item numbers or designators jointly with other users, whereby the user uses the labels assigned to a communication thread identified with the conversation items to compose a response jointly with other users. A further routine is configured to allow a user to annotate conversation items for display of the annotation to that user without changing a display of the annotation to other users.

In another embodiment, a routine is configured to allow each user to select one or more messages corresponding to at least one of the annotations, and provide responses to the messages via the host IM application, corresponding to those annotations.

The present disclosure is also directed to a method for managing communications in a message communication system implemented through a host IM application. The method includes the steps of: providing shared communication with a plurality of users and enhancing the instant messaging experience by enabling collective comments on multiple items in a communication thread; using a host IM application to allow the users to group chat or items in individual communication threads and categorize the individual communication threads into categories by using indicia, thereby allowing each user to select multiple items, order the multiple items, group the multiple items, annotate the multiple items and comment on the multiple items together so as to integrate with the host IM application and enable the implementation of related controls in the host IM application; providing a routine to allow each user to select multiple items as a selected set by using a grouping routine to order the multiple items, group the multiple items, annotate the multiple items and comment on the multiple items together, wherein the grouping routine includes selection of a set of names for different open chat sessions of an instant messenger and providing a single responsive posting to the selected set; providing a routine to allow each user to annotate the single responsive posting in a chat log to indicate the names in the selected set having received the single responsive posting, and allows the user to select multiple items, order the multiple items, group the multiple items, annotate the multiple items and comment on the multiple items together in the selected set; providing a routine to permit the user to further comment on the categories, such a message views the communication threads along with their labels and comments as a unit of communication threads as a chat item, thereby permitting commenting on the communication thread as at least part of the selected set; providing a routine that allows each user to store the communication threads in groups with labels, and comments in the form of annotation for the user's future reference without requiring sending the communication threads with the annotation to other users; and providing a routine to provide a capability of expanding the plurality of users in a conversation thread so as to include more than two users.

The method of the present disclosure also includes one or more of the following steps: providing a routine to permit the user refer to the conversation items and comment on the multiple items, using assigned item numbers or designators jointly with other users, whereby the user uses the labels assigned to a communication thread identified with the conversation items to compose a response jointly with other users; providing a routine to allow each user to allow a user to annotate conversation items for display of the annotation to that user without changing a display of the annotation to other users; and, providing a routine to allow each user to select one or more messages corresponding to at least one of the annotations, and provide responses to the messages via the host IM application, corresponding to those annotations.

The present disclosure is also directed to a message communication system which provides shared communication with a plurality of users and enhance instant messaging experience by enabling collective comments on multiple items in a communication thread. The message communication system includes means for providing shared communication with a plurality of users and enhancing the instant messaging experience by enabling collective comments on multiple items in a communication thread; host IM application means, the host IM application means allowing the users to group chat or items in individual communication threads and categorize the individual communication threads into categories by using indicia, thereby allowing each user to select multiple items, order the multiple items, group the multiple items, annotate the multiple items and comment on the multiple items together so as to integrate with the host IM application means and enable the implementation of related controls in the host IM application means; means for providing a routine to allow each user to select multiple items as a selected set by using a grouping routine to order the multiple items, group the multiple items, annotate the multiple items and comment on the multiple items together, wherein the grouping routine includes selection of a set of names for different open chat sessions of an instant messenger and providing a single responsive posting to the selected set; means for providing a routine to allow each user to annotate the single responsive posting in a chat log to indicate the names in the selected set having received the single responsive posting, and allows the user to select multiple items, order the multiple items, group the multiple items, annotate the multiple items and comment on the multiple items together in the selected set; means for providing a routine to permit the user to further comment on the categories, such a message views the communication threads along with their labels and comments as a unit of communication threads as a chat item, thereby permitting commenting on the communication thread as at least part of the selected set; means for providing a routine that allows each user to store the communication threads in groups with labels, and comments in the form of annotation for the user's future reference without requiring sending the communication threads with the annotation to other users; and means for providing a routine to provide a capability of expanding the plurality of users in a conversation thread so as to include more than two users.

Turning now to the figures, FIG. 1 is a schematic diagram showing a configuration in which a user can select multiple chat items in a conversation and number the multiple chat items sequentially. In this configuration, a user can select a plurality of IM chat items 101 and leave some items in the chat thread unselected 103. In this example, the first message selected is automatically assigned sequence number 1 105, the second message 2 107, and the third message 3 109. It is understood that the messages do not have to be selected in the order shown in FIG. 1.

Figure 2:
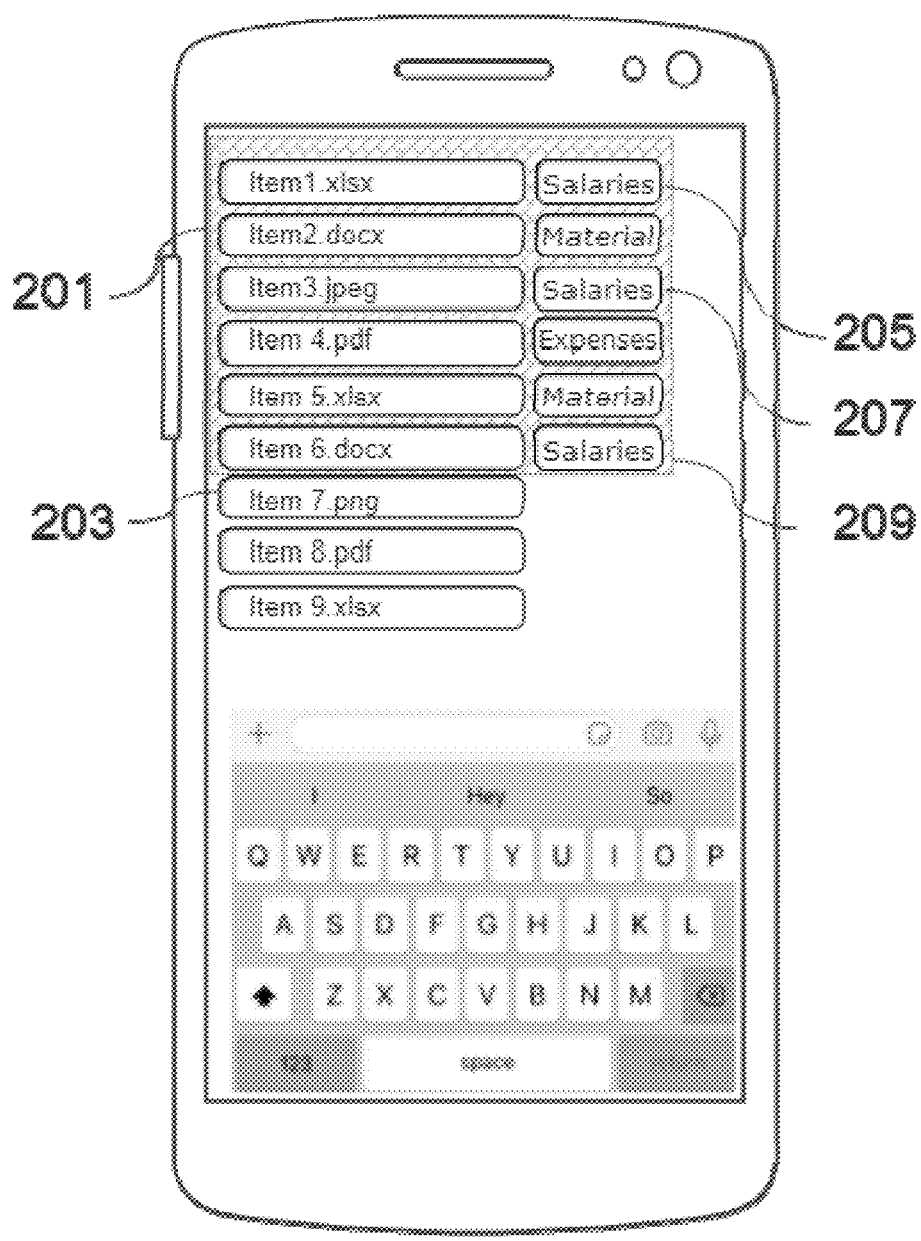
FIG. 2 is a schematic diagram showing a configuration in which a user can select multiple items in a conversation and categorize them using different labels.

FIG. 2 is a schematic diagram showing a configuration in which a user can select multiple items in a conversation and categorize the multiple items using different labels. This example shows a process of categorizing and assigning user-defined labels to the selected messages. A user has selected a plurality of IM messages 201, while some other messages in the chat thread may be left unselected 203. The user has defined a custom label "Salaries" and assigned it to three chat items "Item_1.xlsx" 205, "Item_3.jpeg" 207, and "Item_6.docx" 209.

Figure 3:
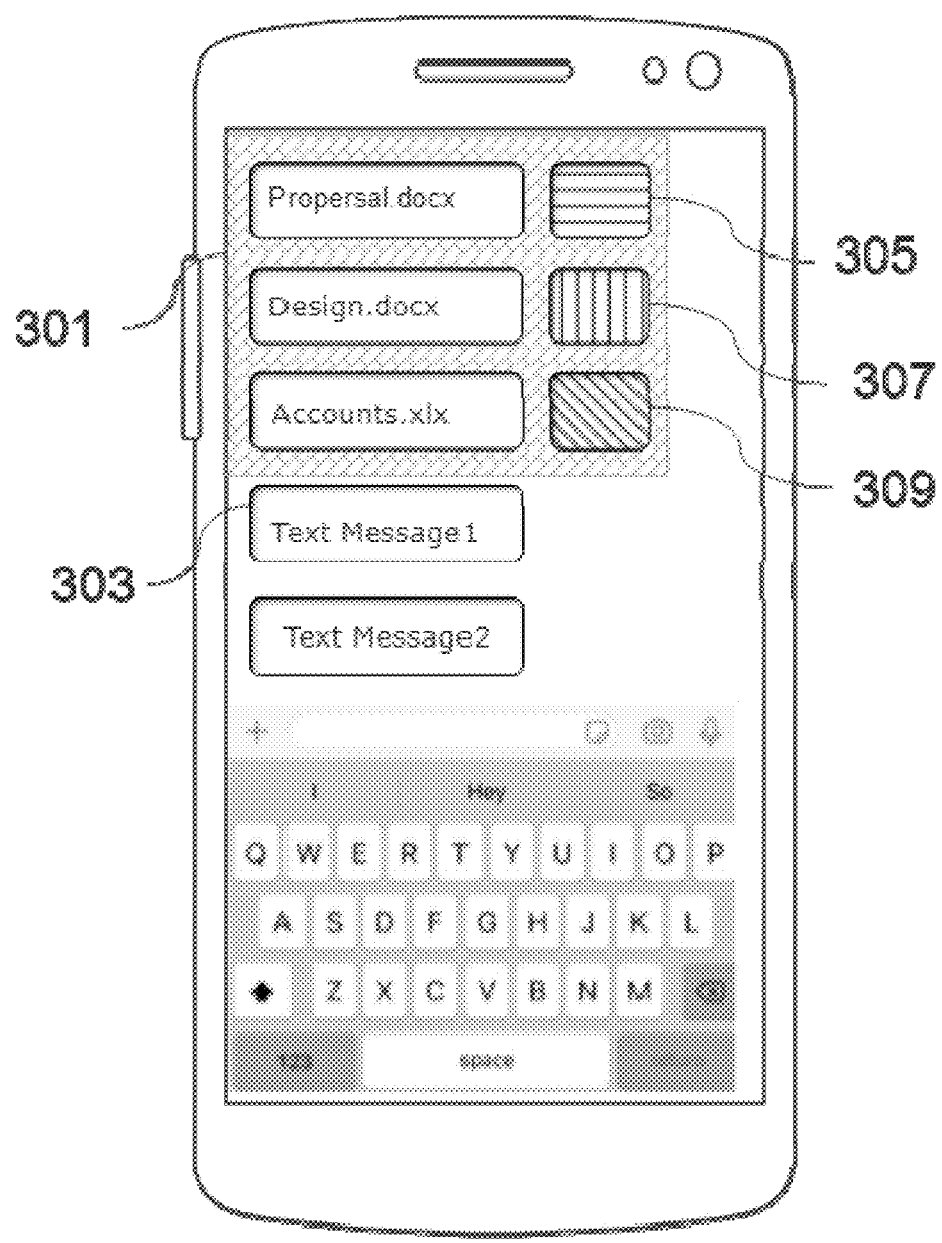
FIG. 3 is a schematic diagram showing a configuration in which the user can select multiple items in a conversation and categorize them using different colors.

FIG. 3 is a schematic diagram showing a configuration in which the user can select multiple items in a conversation and categorize the multiple items using different colors. This implements a process for visual categorization of chat items instead of textual categorization shown in the configuration of FIGS. 1 and 2. A user may select a plurality of chat items 301 and may leave some chat items unselected 303 in a chat thread. The user can group/categorize the selected messages, using different colors or other indicia. By way of non-limiting example, the horizontal, vertical, and diagonal lining patterns represent blue, red, and green colors, respectively. The figure shows the user has labeled the chat item "Proposal.docx" with blue color 305, "Design.docx" with red 307, and "Accounts.xslx" with green 309.

Figure 4:
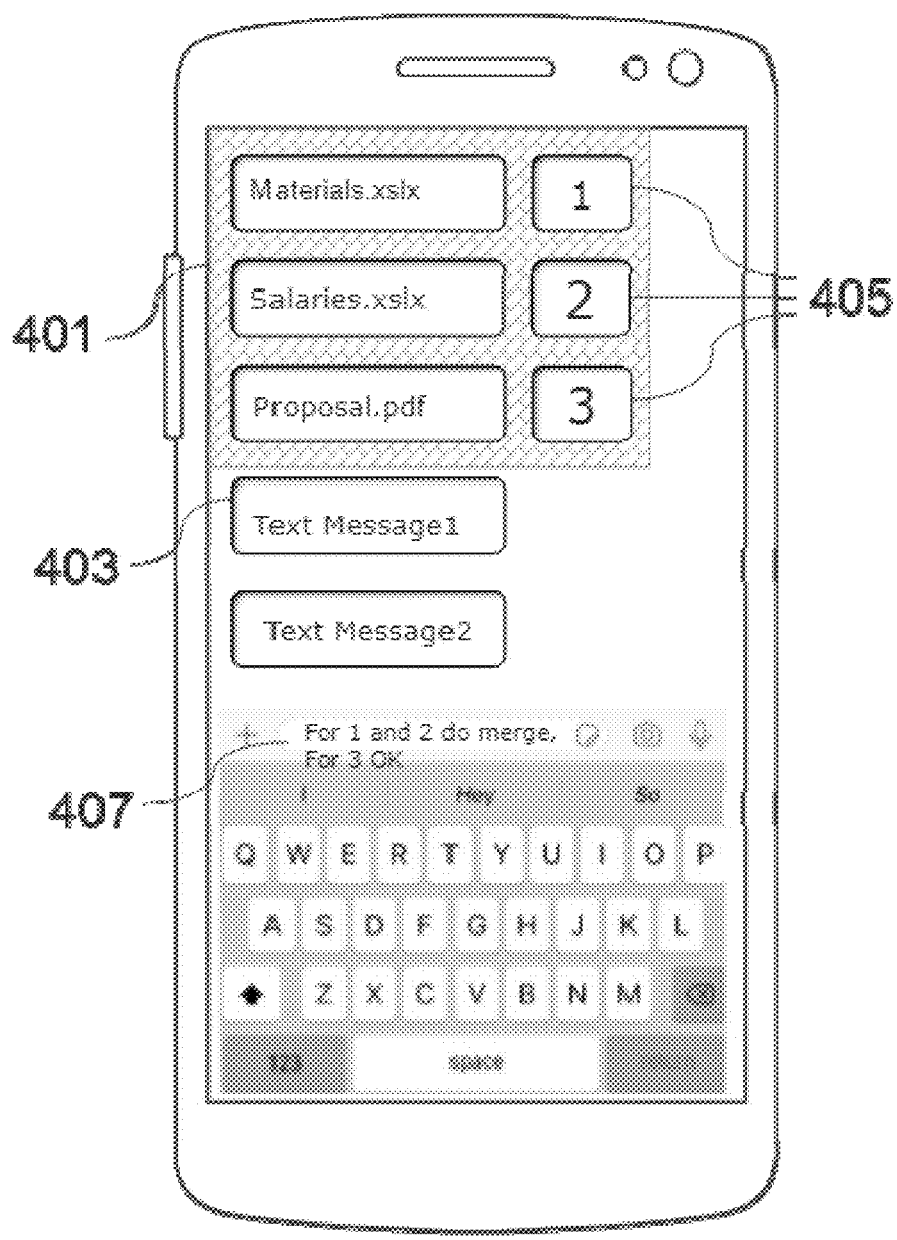
FIG. 4 is a schematic diagram showing a configuration that provides means to refer to the conversation items numbered in the configuration shown in FIG. 1 and comment on them using the assigned item numbers.

FIG. 4 is a schematic diagram showing a configuration that provides means to refer to the conversation items numbered in the configuration of FIG. 1 and comment on the conservation items using the assigned item numbers. This implementation enables a user to use the labels assigned in the configuration of in FIG. 1 to compose a response to the plurality of messages jointly with other users. Referring to FIG. 4, a plurality of messages 401 have been selected by a user, while some messages 403 may have been left unselected. The user exploits the assigned sequential labels 405 to compose a message "For 1 and 2 do merge, For 3 OK" 407.

Figure 5:
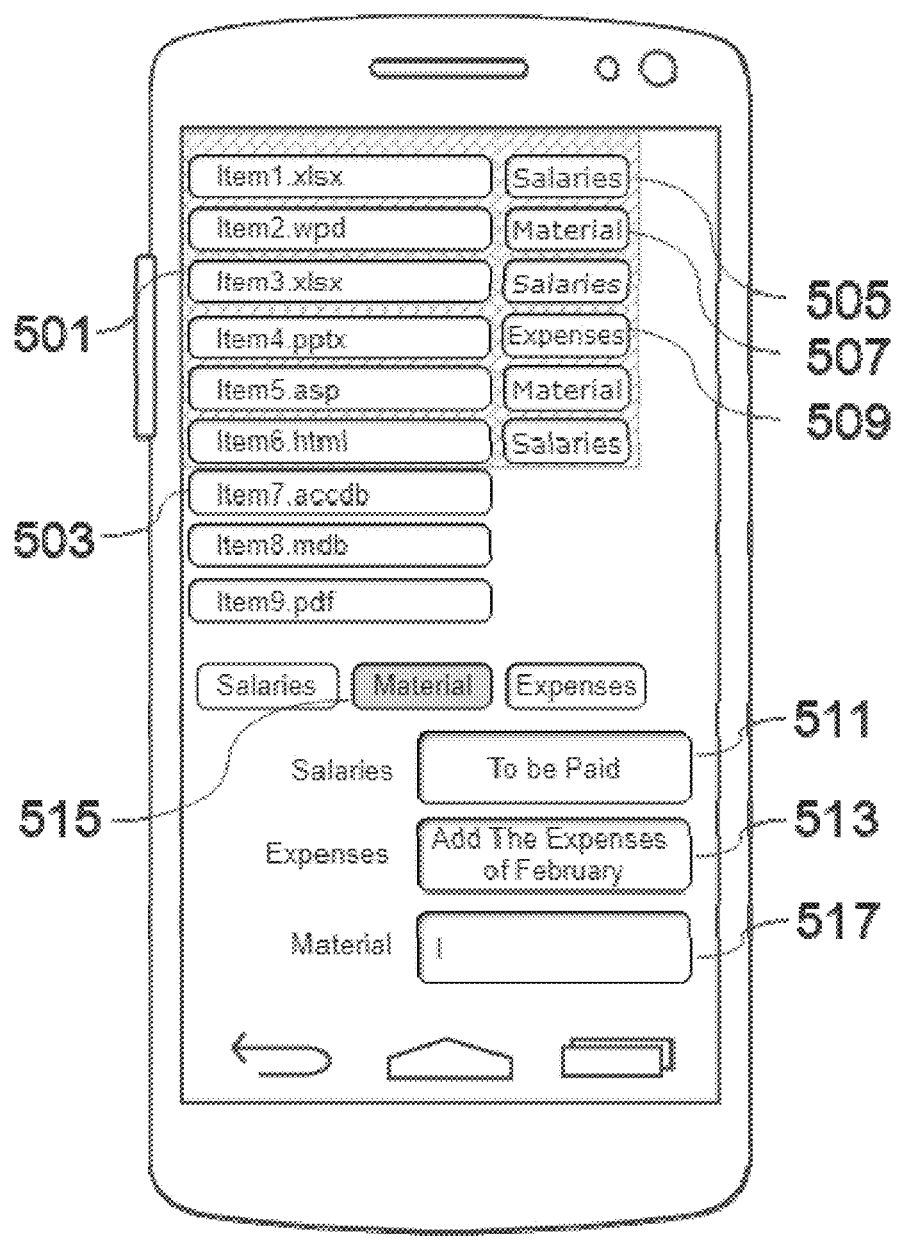
FIG. 5 is a schematic diagram showing a configuration that provides means to refer to the conversation items categorized using labels in the previous configurations and comment on them using these labels.

FIG. 5 is a schematic diagram showing a configuration that provides means to refer to the conversation items categorized using labels in the previously-described configurations and comment on them using these labels. This configuration implements user-assigned labels for a plurality of messages to make comments on these labels jointly with other users. The figure shows a user has selected a plurality of messages 501 while some chat items might be left unselected 503. The user has assigned three labels to the selected messages, namely "Salaries" 505, "Material" 507, and "Expenses" 509. The user has commented on the "Salaries" label with "To be Paid" 511 and the "Expenses" label with "Add the Expenses of February" 513. The figure shows the label "Material" 515 selected by the user, and the system is ready to accept the comment 517 from the user.

Figure 6:
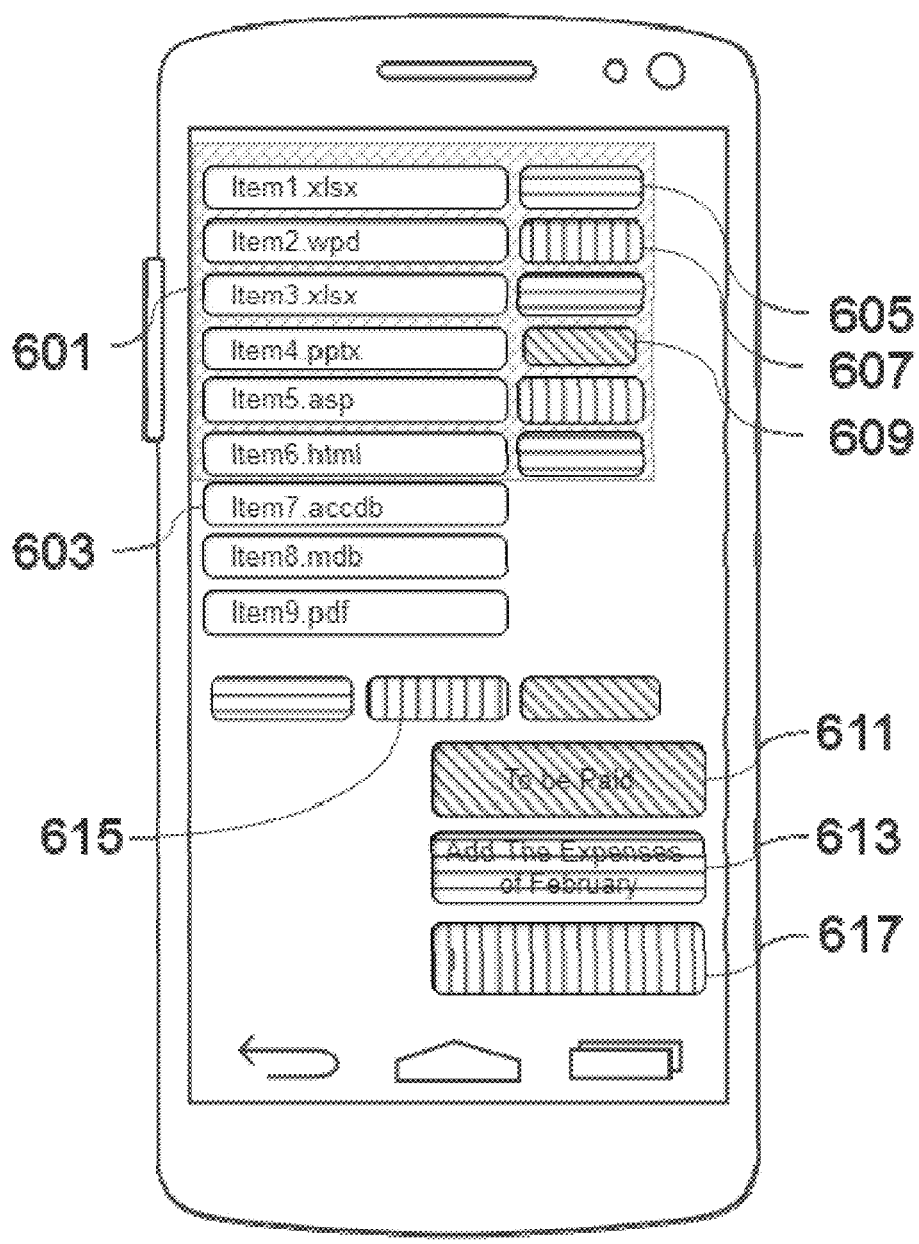
FIG. 6 is a schematic diagram showing a configuration in in which the user can refer to the conversation items categorized using colors in the previous configurations and comment on them using the assigned colors.

FIG. 6 is a schematic diagram showing a configuration in which the user can refer to the conversation items categorized using colors in the previously-described configurations and comment on them using the assigned colors. The configuration of in FIG. 6 shows a plurality of chat items 601 selected by a user, and some items may be left unselected 603. The user has categorized the selected chat items with blue 605, red 607, and green 609 colors. The user has already entered comments for blue "To be Paid" 611 and green "Add the Expenses of February" 613. The user has selected the red color 615, for which the system is ready to accept the user comment 617.

Figure 7:
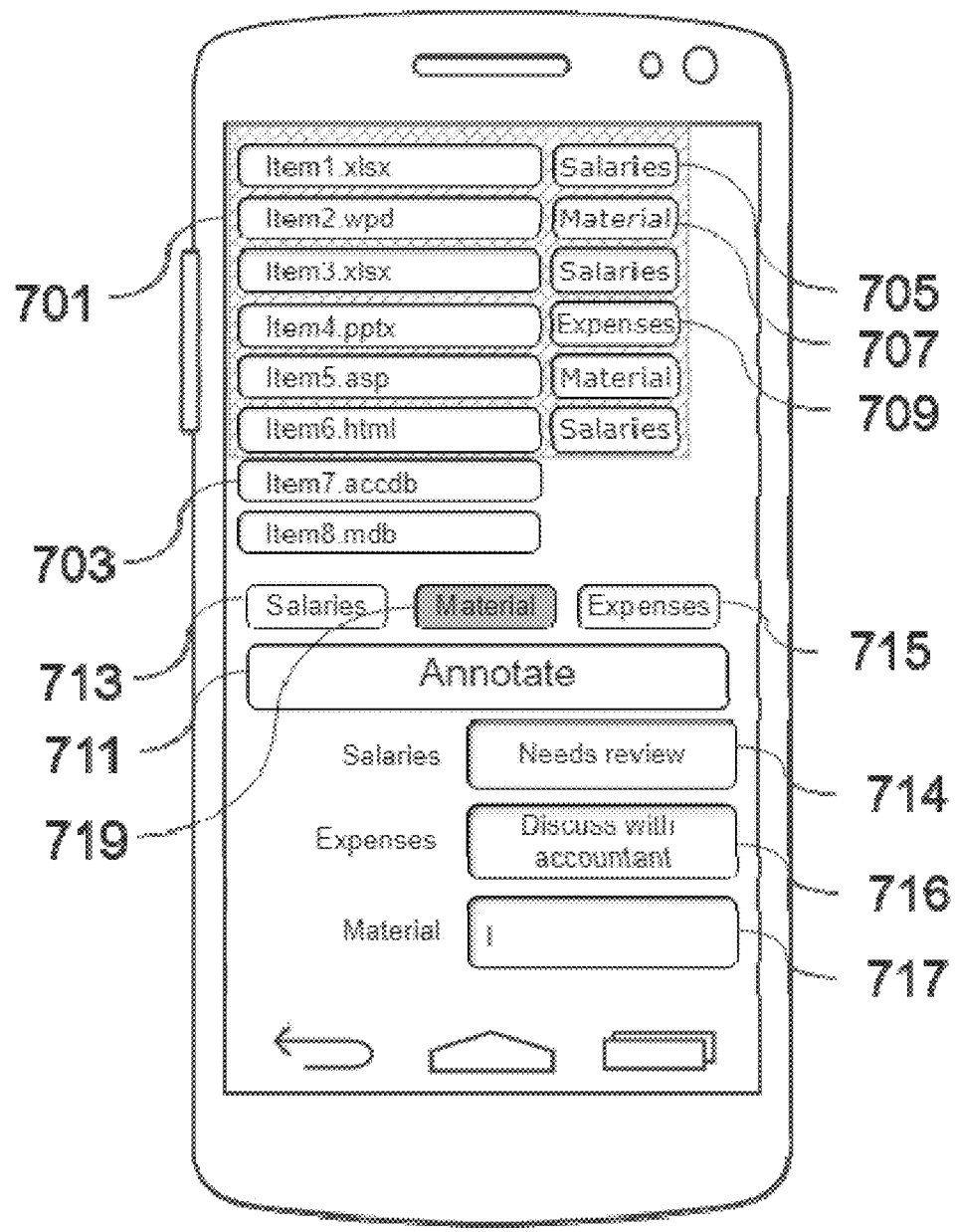
FIG. 7 is a schematic diagram showing a configuration in which the user can use the configuration of FIG. 5 to annotate a labeled group of messages by entering comments that can be used later for the user's own reference.

FIG. 7 is a schematic diagram showing a configuration in which the user can use the configuration of FIG. 5 to annotate a labeled group of messages by entering comments that can be used later for the user's own reference. Although the previously-described configurations are useful for communication among individuals, users sometimes need to annotate chat items for the user's own future reference instead of sending comments to others. For example, they can serve as to-do action items for the future. Other uses involve marking important items for easy retrieval in the future or simply grouping the related items with descriptive comments. The diagram shows a configuration of the disclosed technology to enable a user to annotate a plurality of chat items categorized into user-defined labels. The user can select a plurality of chat items 701, while some chat items may be left unselected 703. The example shows three labels "Salaries" 705, "Material" 707, and "Expenses" 709. The "Salaries" label 713 has been annotated 711 as "Needs review" 714, while the "Expenses" label 715 has been annotated with "Discuss with accountant" 716. The system is ready to accept the annotation comment 717 from the user for the "Material" label 719.

Figure 8:
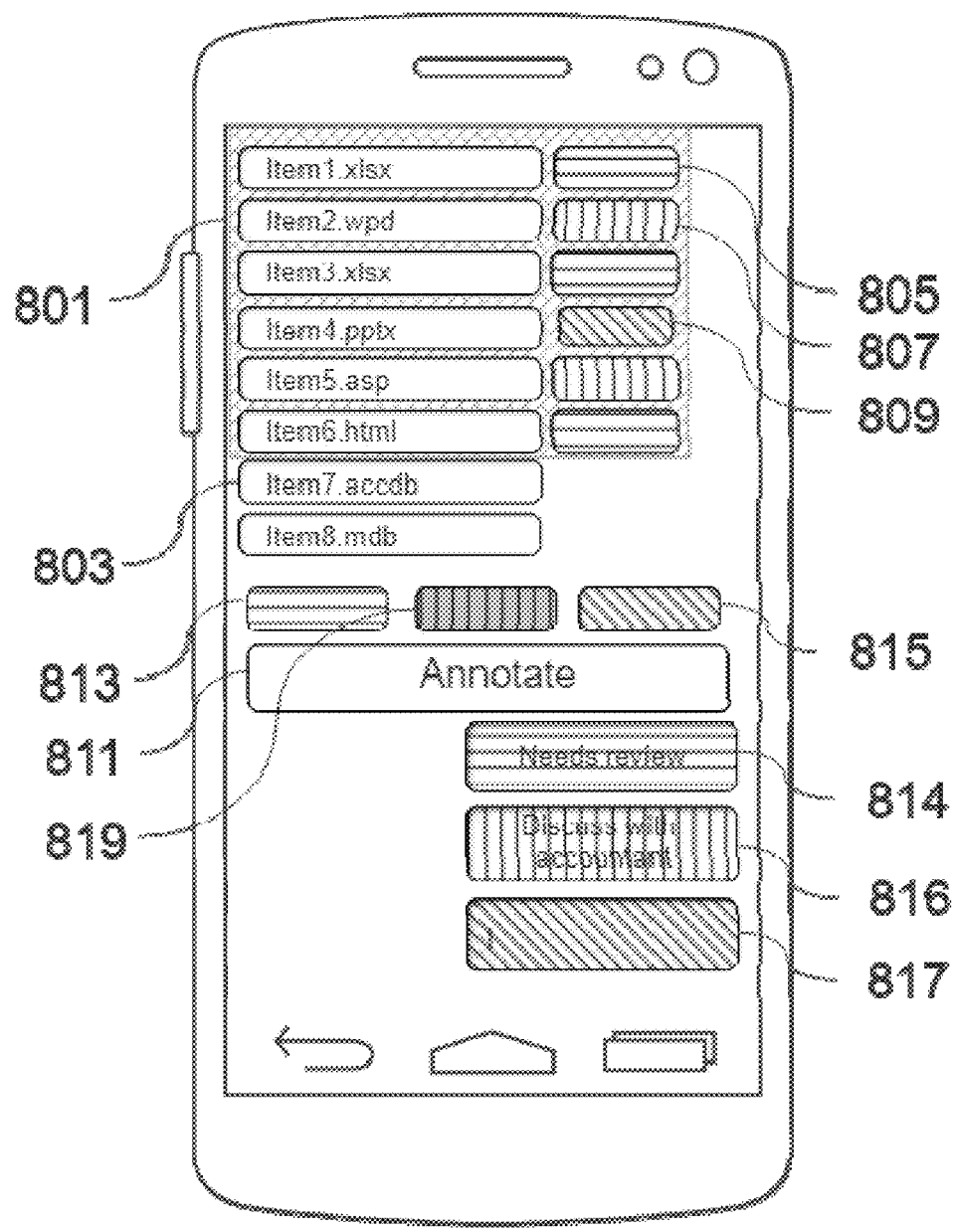
FIG. 8 is a schematic diagram showing a configuration in which the user can use the configuration of FIG. 6 to annotate a group of messages categorized by colors and give comments that can be used later for the user's own reference.

FIG. 8 is a schematic diagram showing a configuration in which the user can use the configuration of FIG. 6 to annotate a group of messages categorized by colors and give comments that can be used later for the user's own reference. The diagram shows a configuration of the disclosed technology to enable a user to annotate a plurality of chat items categorized using colors. The user can select a plurality of chat items 801, while some chat items may be left unselected 803. The example shows three colors, blue 805, red 807, and green 809. The blue label 813 has been annotated as "Needs review" 714, while the green label 815 has been annotated with "Discuss with accountant" 816. The system is ready to accept the annotation comment from the user 817 for the red label 819.

Figure 9:
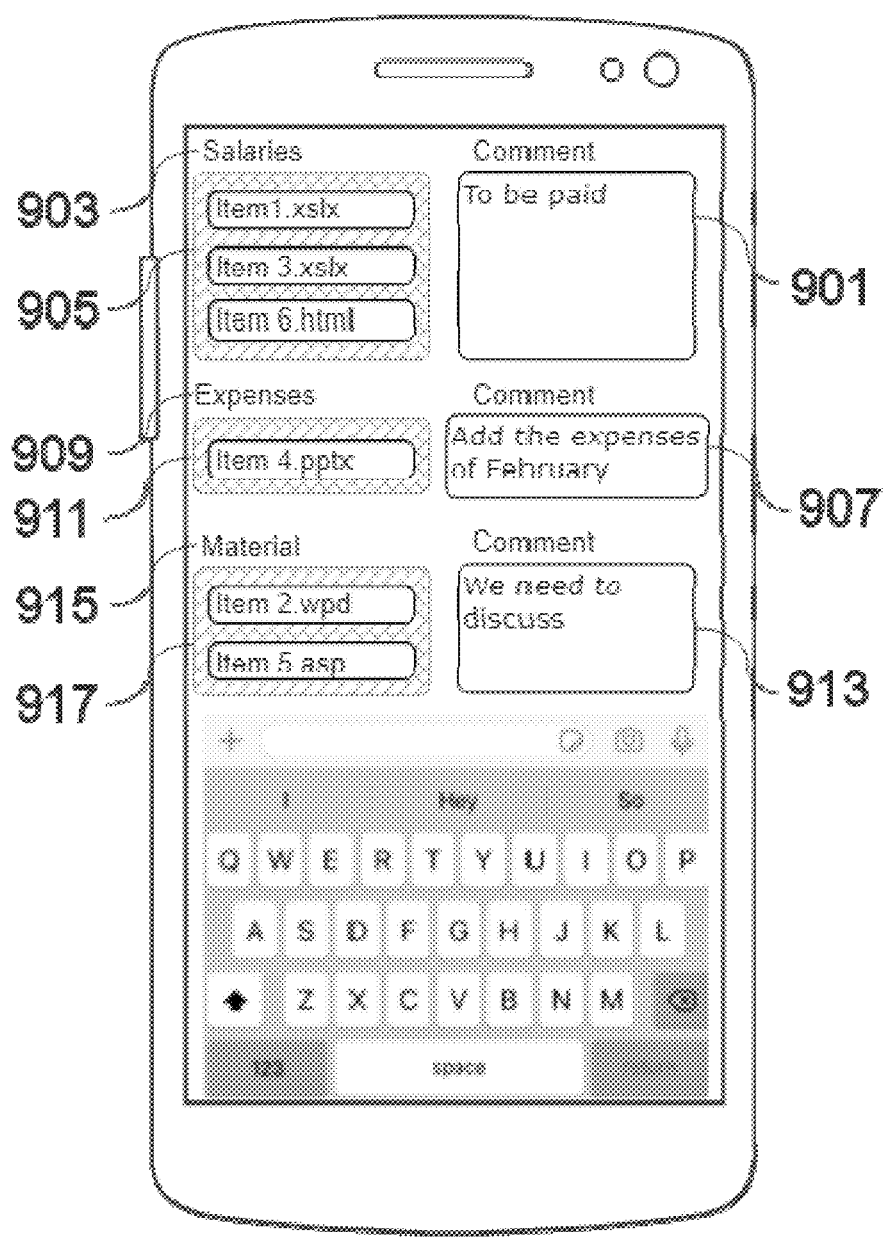
FIG. 9 is a schematic diagram showing a configuration in which the receiver can view the grouped messages and the sender's comments in a labeled group, along with the comments.

FIG. 9 is a schematic diagram showing a configuration in which another configuration shows how the receiver can view the grouped messages and the sender's comments in a labeled group, along with the comments. This shows an example of the receiver side of the comments on categorized and labeled groups of chat items using the configuration of FIG. 5. In this example, a user has assigned three labels to a plurality of messages and commented on these labels. The receiver of this message can view the comment "To be Paid" 901 on the category "Salaries" 903 and the associated chat items "Item_1.xslx", "Item_3.xsl", and "Item_6.html" 905 as a unit. Similarly, the comment "Add the expenses of February" 907 can be viewed for the category labeled "Expenses" 909 associated with the chat item "Item_4.pptx" 911, and the comment "We need to discuss" 913 for the category labeled "Material" 915 and the associated chat items "Item_2.wpd" and "Item_5.asp" 917.

Figure 10:
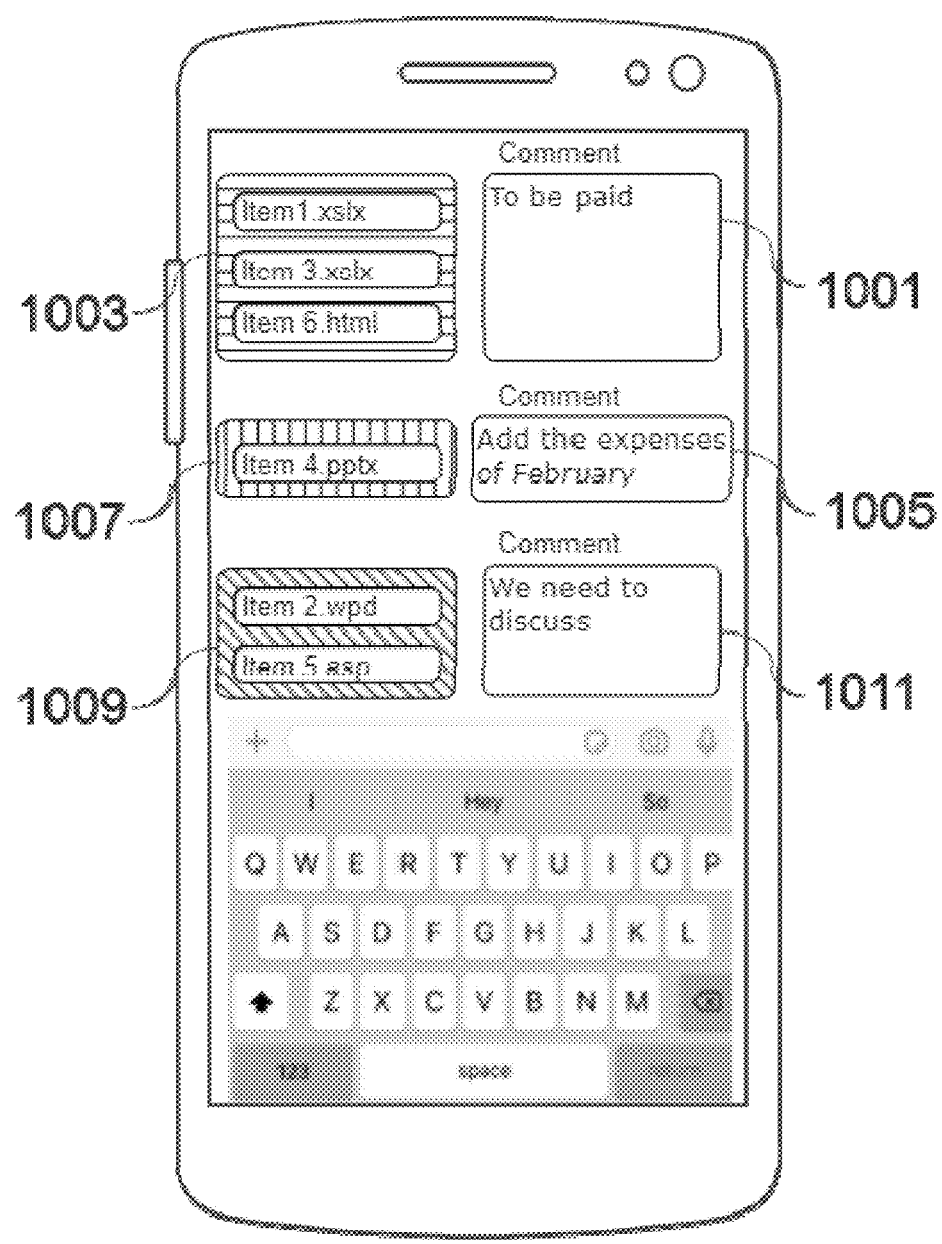
FIG. 10 is a schematic diagram showing a configuration in which the receiver can view the grouped messages and the sender's comments in a color-labeled group, along with the comments.

FIG. 10 is a schematic diagram showing a configuration in which another configuration shows how the receiver can view the grouped messages and the sender's comments in a color-labeled group, along with the comments. This configuration identifies receiver of the categorization by colors and associated comments sent by a sender, as shown in configuration of in FIG. 6. The receiver of this message can view the comment "To be Paid" 1001 on the associated chat items "Item_1.xslx", "Item_3.xsl", and "Item_6.html" highlighted in the blue color 1003. Similarly, the comment "Add the expenses of February" 1005 can be viewed for the associated chat item "Item_4.pptx" highlighted in red color 1007, and the comment "We need to discuss" 1011 for chat items "Item_2.wpd" and "Item_5.asp" highlighted in green color 1009.

Figure 11:
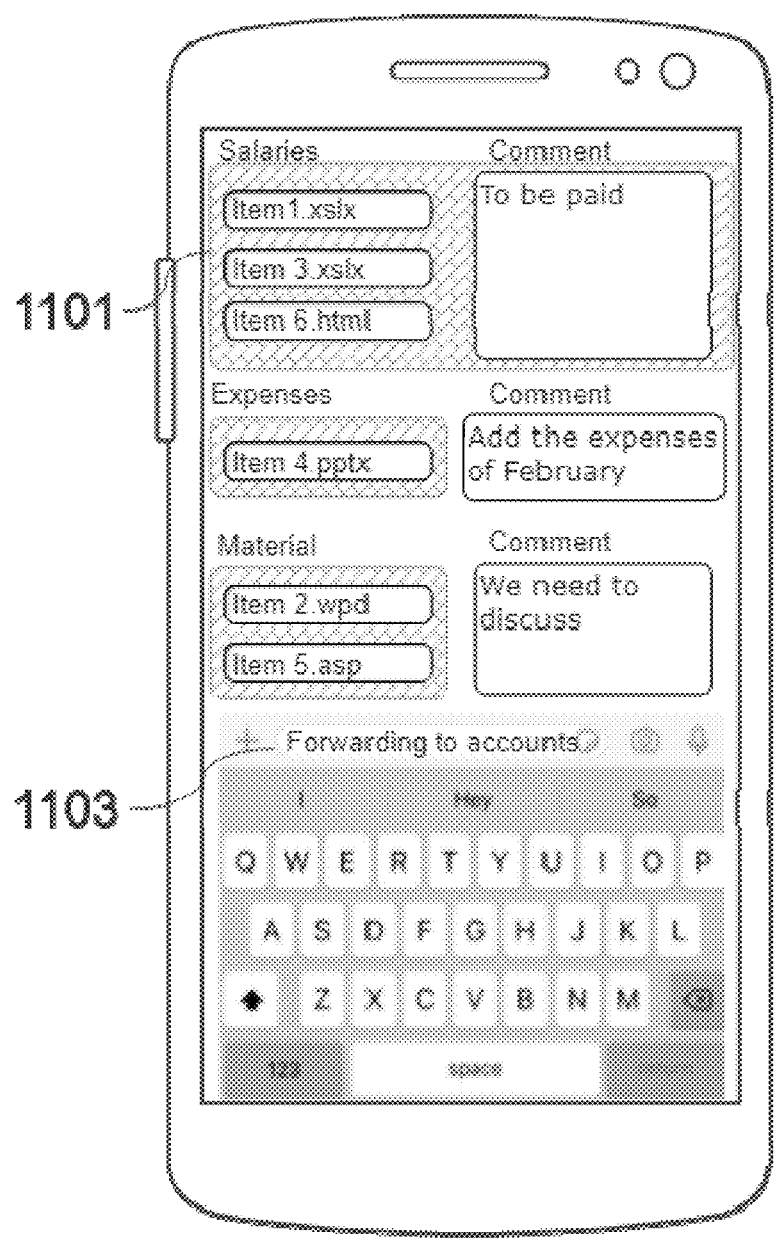
FIG. 11 is a schematic diagram showing a configuration in which the receiver can respond to a comment on a previously created group of messages.

FIG. 11 is a schematic diagram showing a configuration in which the receiver can respond to a comment on a previously created group of messages. The figure shows the process to enable the receiver to reply to the categorized messages with associated comments, as described in configuration depicted in FIG. 11. In this example, a user has selected the "Salaries" label with the associated chat items and the comment 1101 to compose a reply to this communication "Forwarding to accounts" 1103.

Figure 12:
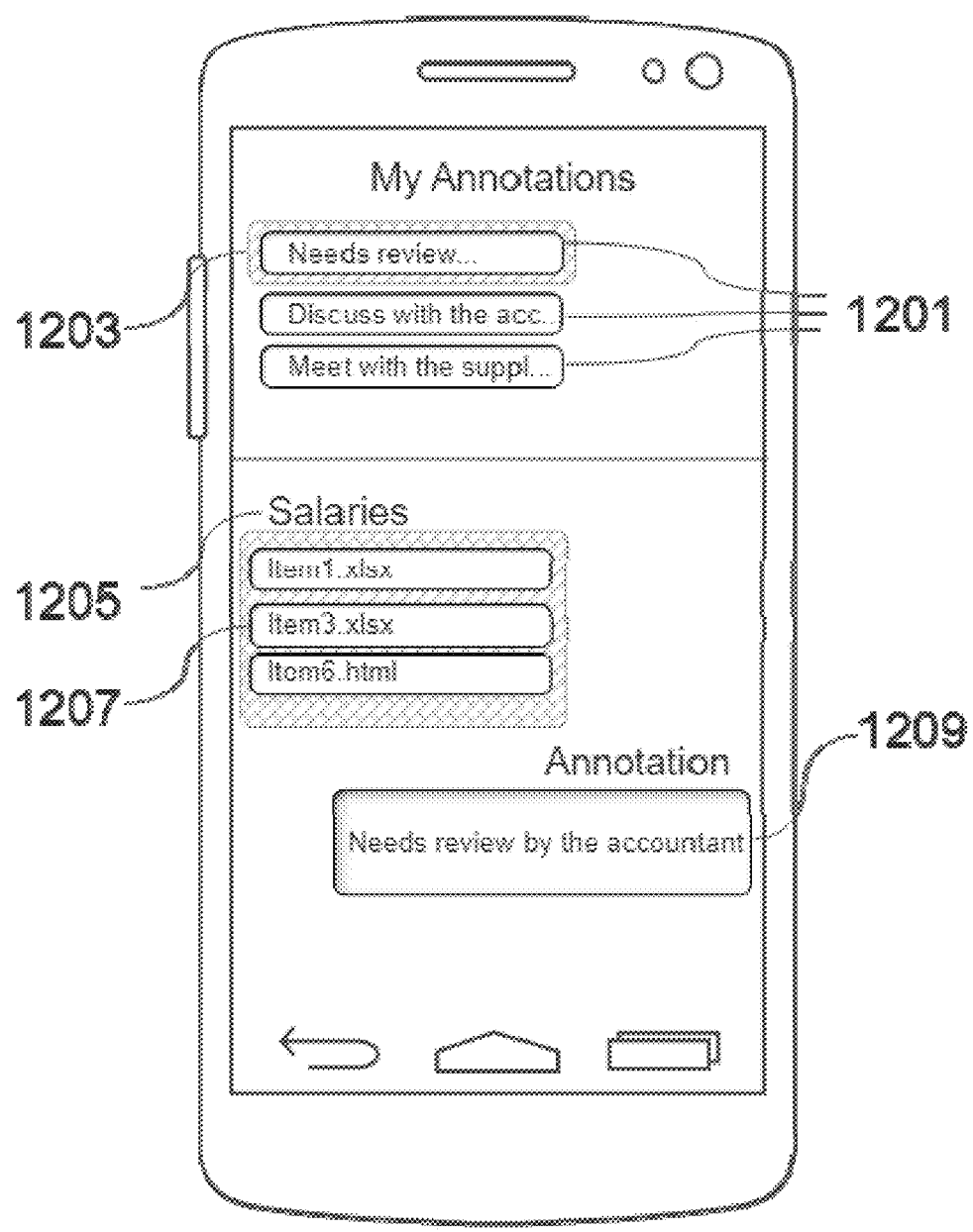
FIG. 12 is a schematic diagram showing a configuration in which the user can view the annotations previously added to a labeled or colored group of messages.

FIG. 12 is a schematic diagram showing a configuration in which the user can view the annotations previously added to a labeled or colored group of messages. The figure shows the annotations generated by the user in the configuration given above. The figure shows three annotations 1201 given by the user. The user has selected the annotation "Needs review" 1203. The system shows the label for this annotation "Salaries" 1205, the associated items "Item_1.xslx", "Item_3.xsl", and "Item_6.html" 1207, and the complete annotation "Needs review by the accountant" 1209.

CLOSING STATEMENT

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method for managing communications in a message communication system implemented through a host instant messaging (IM) application, the method comprising:
    providing shared communication with a plurality of users of the host IM application, the shared communication including a communication thread having a plurality of items;
    providing a routine to allow each of the users to privately select multiple ones of the plurality of items and provide individual ones of the selected multiple ones with a user selectable label;
    providing a routine to form groups of the items sharing the same label;
    providing a routine to allow each of the users to privately annotate each of the groups of the items sharing the same label;
    providing a routine to allow each of the users to privately add a comment to each of the groups of the items sharing the same label;
    providing a routine that allows each of the users to privately store the selected multiple ones of the plurality of items, the labels, the groups, the annotations and the comments without requiring sending thereof to other ones of the users; and
    providing a routine to provide a capability of expanding the plurality of users in a conversation thread so as to include more than two users.

2. The method of claim 1, further comprising:
    providing a routine to allow each of the users to share at least one of the labels, the groups, the annotations and the comments with at least another one of the users such that the at least one another one of the users can respond thereto.

3. The method of claim 1, further comprising:
providing a routine to allow each user to allow a user to annotate conversation items for display of the annotation to that user without changing a display of the annotation to other users.

4. The method of claim 1, further comprising:
providing a routine to allow each user to select one or more messages corresponding to at least one of the annotations, and provide responses to the messages via the host IM application, corresponding to those annotations.

* * * * *